(12) United States Patent
de Brun et al.

(10) Patent No.: US 11,975,785 B2
(45) Date of Patent: May 7, 2024

(54) AUTOMATED BICYCLE LIGHT SYSTEM

(71) Applicant: Redshift Sports LLC, Philadelphia, PA (US)

(72) Inventors: Erik Teig de Brun, San Francisco, CA (US); Stephen Dewei Ahnert, San Bruno, CA (US); Scott David Poff, Philadelphia, PA (US); Justin T. Dodd, Philadelphia, PA (US)

(73) Assignee: REDSHIFT SPORTS LLC, Philadelphia, PA (US)

( * ) Notice: Subject to any disclaimer, the term of this patent is extended or adjusted under 35 U.S.C. 154(b) by 0 days.

(21) Appl. No.: 18/481,699

(22) Filed: Oct. 5, 2023

(65) Prior Publication Data

US 2024/0025504 A1 Jan. 25, 2024

Related U.S. Application Data

(63) Continuation of application No. 18/263,726, filed as application No. PCT/US2022/042910 on Sep. 8, 2022.

(60) Provisional application No. 63/221,326, filed on Jul. 13, 2021.

(51) Int. Cl.
*B62J 6/057* (2020.01)
*B62J 45/41* (2020.01)
*B62M 3/16* (2006.01)

(52) U.S. Cl.
CPC ............... *B62J 6/057* (2020.02); *B62J 45/41* (2020.02); *B62M 3/16* (2013.01)

(58) Field of Classification Search
CPC ............. B62J 6/057; B62J 45/41; B62M 3/16
See application file for complete search history.

(56) References Cited

U.S. PATENT DOCUMENTS

| | | | |
|---|---|---|---|
| 3,764,976 A * | 10/1973 | MacMahon | B62J 6/16 340/432 |
| 5,662,405 A * | 9/1997 | Kuo | B62J 6/06 340/432 |
| 5,902,038 A | 5/1999 | Curry | |

(Continued)

FOREIGN PATENT DOCUMENTS

| CN | 216660187 U | 6/2022 |
|---|---|---|
| CN | 217575498 U | 10/2022 |

OTHER PUBLICATIONS

International Search Report and Written Opinion pertaining to corresponding PCT Application PCT/US2022/042910, dated Feb. 2, 2023.

*Primary Examiner* — Thomas M Sember
(74) *Attorney, Agent, or Firm* — GRUMBLES LAW PLLC; Brittany Haanan

(57) ABSTRACT

An automated bicycle lighting system comprising light modules that contain sensors and a processor which enable the color and/or flash state of the emitted light to be changed depending upon the physical orientation of the modules is provided. The sensors and processor also allow the operating state of the light modules to be adjusted depending upon whether movement of the light modules is sensed. The modules are used in combination with pedals configured to removably receive the modules and/or with an auxiliary mount that provides for mounting the modules to other components of a bicycle, such as, for example, handlebars, seat-posts, frame tubes, helmets and/or a rider's clothing.

19 Claims, 13 Drawing Sheets

(56) References Cited

U.S. PATENT DOCUMENTS

| | | | |
|---|---|---|---|
| 6,550,945 B2* | 4/2003 | Chiu | B62M 3/08 |
| | | | 362/543 |
| 7,411,631 B1 | 8/2008 | Joshi et al. | |
| 7,901,118 B2* | 3/2011 | Chia-Li | B62M 3/12 |
| | | | 362/192 |
| 8,132,945 B2 | 3/2012 | Lunde | |
| 2005/0028639 A1* | 2/2005 | Chang | B62J 6/20 |
| | | | 74/594.4 |
| 2009/0054182 A1 | 2/2009 | Miki et al. | |
| 2014/0354419 A1 | 12/2014 | Frier et al. | |
| 2019/0210679 A1 | 7/2019 | Hyeon | |

* cited by examiner

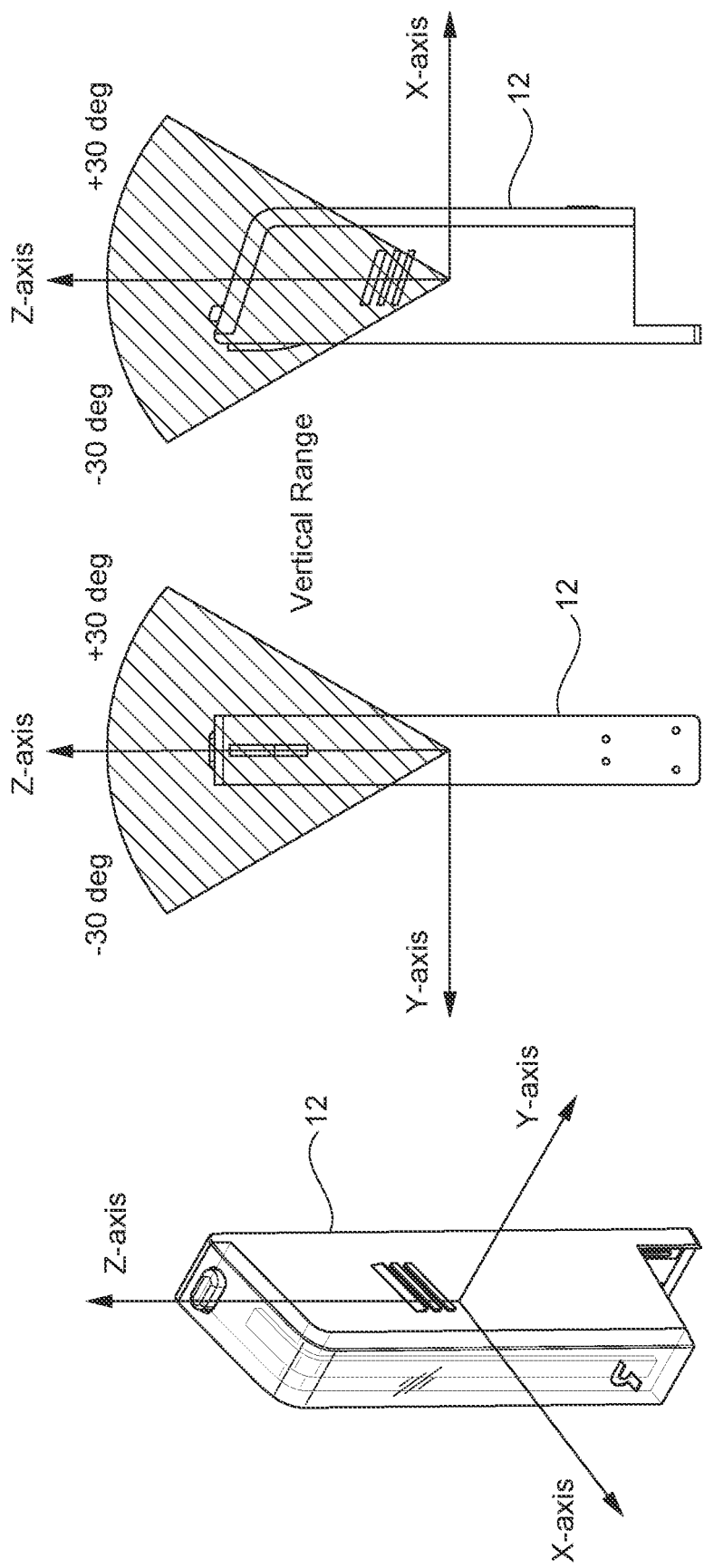

AUTOMATED BICYCLE LIGHT SYSTEM

TECHNICAL FIELD

The present invention relates to bicycle safety equipment and specifically to a pedal featuring removable, position sensing light modules.

BACKGROUND

At an early stage of bicycle development, bicycles and bicycle pedals were equipped with reflectors to improve safety while cycling at night. Reflectors, while effective, are dependent however on outside light sources for illumination such as automobile headlamps or streetlights. In the absence of an outside light source, reflectors are inoperative. Later bicycles were equipped with handlebar mounted headlamps and rear frame mounted taillights using incandescent bulbs. Typically, such lights were battery powered, although generator driven headlamps have also been marketed. The main drawback of these systems was that incandescent bulbs whether battery or generator powered produce a relatively dim light beam with little forward projection.

More recently, LED based battery powered lights have become available for handlebar and frame mounting. LED lights have proven to be a substantial step forward in the art of bicycle lights as they provide substantial increases in light output over incandescent bulb lights and have proven effective as both headlamps which typically project white light and tail lamps which typically project red light. Electrical circuits have also been developed that allow tail lamps to operate in a blinking mode.

To further increase the safety of a cyclist riding at night, LED lamps have been designed for use with bicycle pedals, typically as an "add-on" product that is attached to the pedals. Prior art LED based lights for pedals typically feature amber LEDs facing forward and rearward as the lights lack any ability to sense whether they are in a forward or rearward facing position. Prior pedal mounted LED lights typically also suffer from a narrow beam spread having little forward projection. As such, the lights are effective principally only for indicating the presence of a cyclist, but otherwise providing only very limited forward illumination, if any, and are generally not useful for assisting a cyclist in seeing a road or trail surface when riding at night. Prior art pedal mounted lights also typically provide little in the way of side illumination and are cumbersome to turn on or off as they are manually operated.

As discussed above, there is room for improvement in the art of pedal mounted bicycle lights. What is needed in the art are pedal mounted lights that have position and motion sensing capabilities. Position sensing capability would allow the lights to "sense" whether they were facing forward or rearward.

SUMMARY

The automated bicycle lighting system of the present invention comprises light emitting diode ("LED") based light modules and a bicycle pedal specially designed to accommodate the light modules, as well as other mounting devices for the modules.

The pedal mounted bicycle light modules of the present invention improve upon the prior art by providing light modules that are able to sense their relative position on the bicycle, i.e. the light modules can automatically sense whether they are forward or rearward facing. By providing motion sensing capability, the light modules are also able to sense whether they are either at rest or moving. The present invention also comprises a pedal specially designed to accommodate the light modules, as well as other mounting devices for the modules.

Position sensing ability provides substantial advantages over the prior art in that when the light modules sense that they are in a forward facing position, they project a bright white light that improves upon a cyclist's ability to see the road or trail in front of him in addition to indicating to motor vehicles that a cyclist is present. When the light modules' sense that they are in a rearward facing position, the modules project a bright red light which warns approaching or overtaking motor vehicles of the presence of a cyclist. As the light modules of the present invention automatically detect whether they are forward or rearward facing and automatically determine what type of light, i.e. white or red, to output based upon detected position, a cyclist need not be concerned with pedal position when first setting off on his bike. That is, a cyclist need not manually rotate the pedals at the start of every ride to ensure that the white light is facing forward.

The motion sensing capabilities of the pedal mounted light modules of the present invention also provide substantial advantages over prior art pedal mounted lights. In particular, the light modules' ability to sense whether they are at rest or moving, which corresponds to the bicycle on which they are mounted being at rest or moving, allows the modules to adjust LED power output. Thus, when motion is sensed, the LEDs operate at maximum output. When motion stops, LED output is reduced or turned off for a predetermined period of time, as the light modules enter a "standby mode." In the standby mode, sensitivity to motion is quite high and upon detection of even a small amount of resumed motion, the light modules will quickly turn on the LEDs or ramp up output. After passage of the preset time period, the light modules enter into a sleep state having reduced sensitivity to motion. The light modules will automatically wake up however, upon the detection of a pre-determined increase in the amount of motion or after a threshold amount of motion has been detected for a specific duration. Motion sensing capability not only conserves battery power, but also eliminates the need for a cyclist to manually turn on or adjust the light modules prior to setting off on a ride.

The above and other advantages of the pedal lighting system of the present invention will be described in more detail below.

BRIEF DESCRIPTION OF DRAWINGS

FIG. 10a is an exemplary perspective view of a light module of the present invention with reference to X, Y and Z reference axes.

FIG. 10B is an exemplary diagram indicating when a light module is in a vertical orientation in a Y-Z plane.

FIG. 10C is an exemplary diagram indicating when a light module is in a vertical orientation in a X-Z plane

MODES FOR CARRYING OUT THE INVENTION

Figure 1:
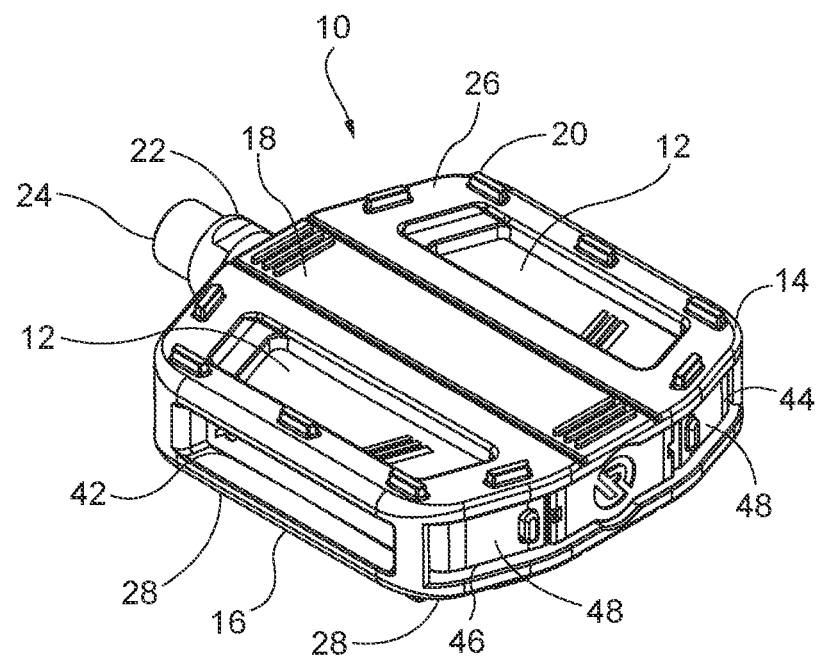
FIG. 1 is a right-facing perspective view of the Automated Bicycle Light System of the present invention showing a pedal and light modules enclosed within the pedal.

The present invention will now be described more fully hereinafter with reference to the accompanying drawings, in which preferred embodiments of the invention are shown. The invention may, however, be embodied in many different forms and should not be construed as being limited to the embodiments set forth herein. Rather these embodiments are provided so that this disclosure will be thorough and complete, and will fully convey the scope of the invention to those skilled in the art. Like numbers refer to like elements throughout.

With reference to FIGS. 1-4, the automated bicycle lighting system 10 of the present invention comprises LED based light modules 12 and a bicycle pedal 14 specially designed to accommodate the light modules 12. Other mounting devices for the light modules 12 are also presented.

In the exemplary embodiment, the pedal 14 of the present invention generally includes a pedal frame 16, which includes a hub 18. The hub 18 includes an axle 22. The axle 22 is freely rotatable within the hub 18 which is connected to the pedal frame 16. An inboard end 24 of the axle 22 is threaded and is attachable to a conformably threaded opening in a bicycle crank arm (not shown). The pedal frame 16 includes a first platform 26 and a second platform 28 and a pattern of treads 20 disposed on both the first platform 26 and second platform 28. The pattern of treads 20 function to improve the engagement between a cyclist's shoe and the pedal 14.

Figure 7:
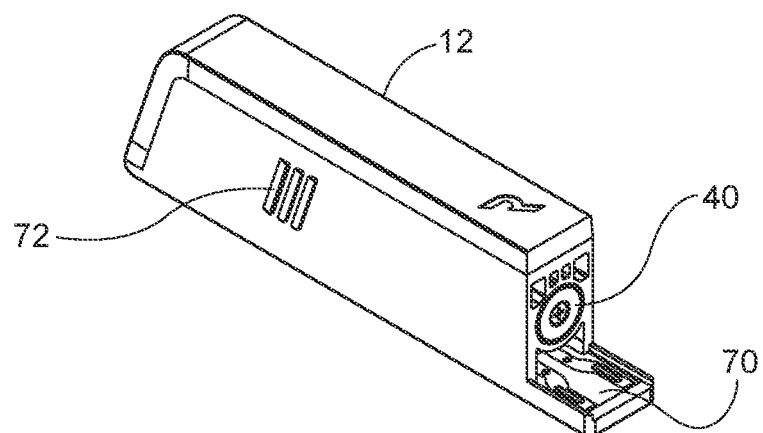
FIG. 7 is another perspective view of a light module of FIG. 6, showing the module in a horizontal orientation.
Figure 8:
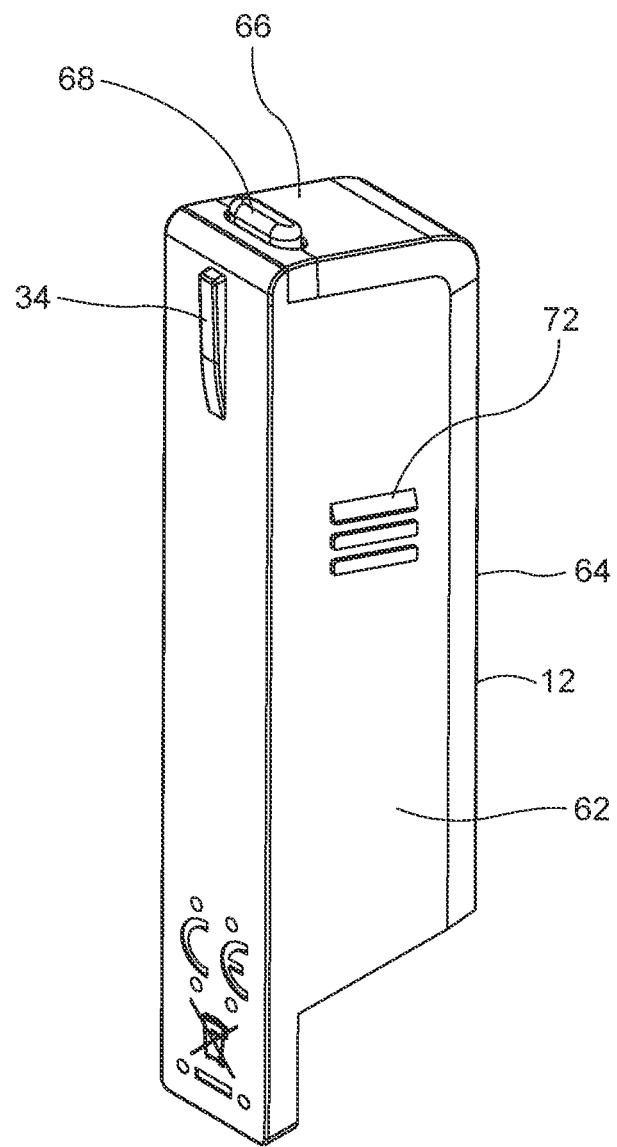
FIG. 8 is a left-facing perspective view of a light module of FIG. 6, showing the module in a vertical orientation.

The pedal frame 16 includes a pair of light module retention slots 30 disposed equidistant from each other on each side of the hub 18 and between the first platform 26 and second platform 28. Each light module retention slot 30 includes an anti-rattle slot 32 (best shown in FIGS. 2 and 4) which engages with an anti-rattle tab 34 (see FIGS. 3 and 8) formed on each light module 12. Disposed in a sidewall 36 of the light module retention slot 30 is a magnet 38. (Best shown in FIG. 4.) Disposed in a face of each light module 12 is a magnet 40. (See FIGS. 3 and 7.) The magnets 38 and 40 are of generally of similar physical configuration and are of the opposite polarity. Consequently, the magnets 38 and 40, being of the opposite polarity, function to keep the light modules 12 securely retained in the light module retention slots 30. The pedal frame also includes power connector retention slots 35 (see FIG. 4) which receive a power connector 70 of the light module 12 for the purpose of better securing the light module 12 in the light module retention slot 30 of the pedal frame 16.

The pedal frame 16 also includes longitudinal pedal face openings 42 disposed equidistant from each other about the hub 18. The longitudinal pedal face openings 42 are disposed generally parallel to a longitudinal axis of the pedal axle 22. The longitudinal pedal face openings 42 serve to allow light to be projected from a longitudinal face of each light module 12.

Figure 2:
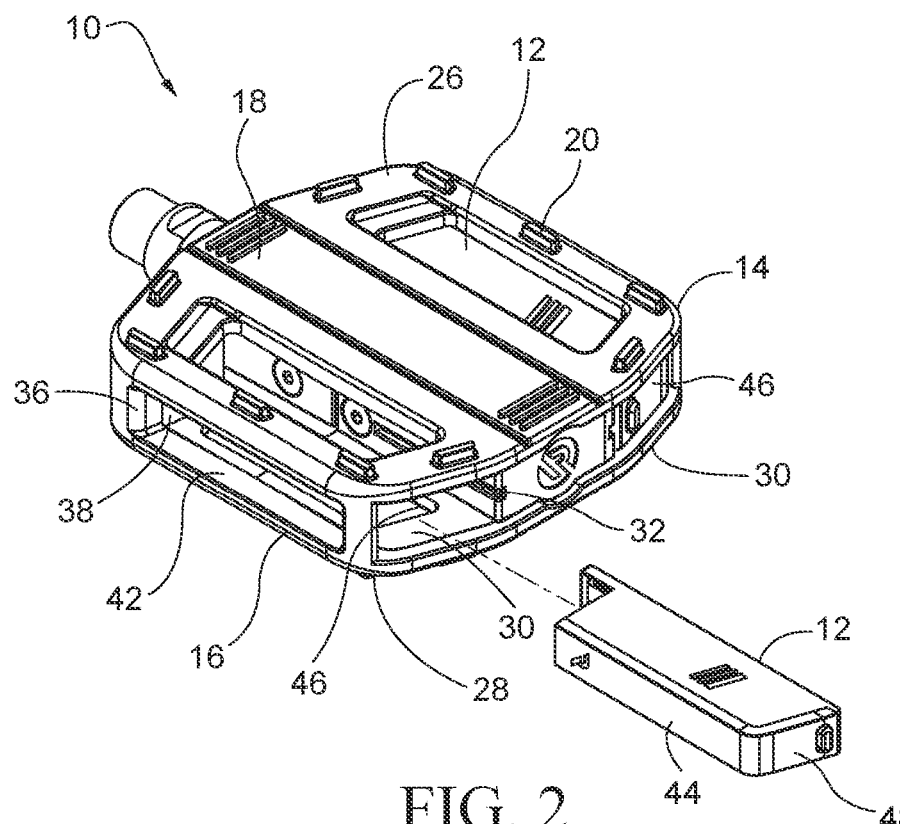
FIG. 2 is a right-facing perspective view of the Automated Bicycle Light System of the present invention showing a pedal with one light module removed from the pedal.
Figure 3:
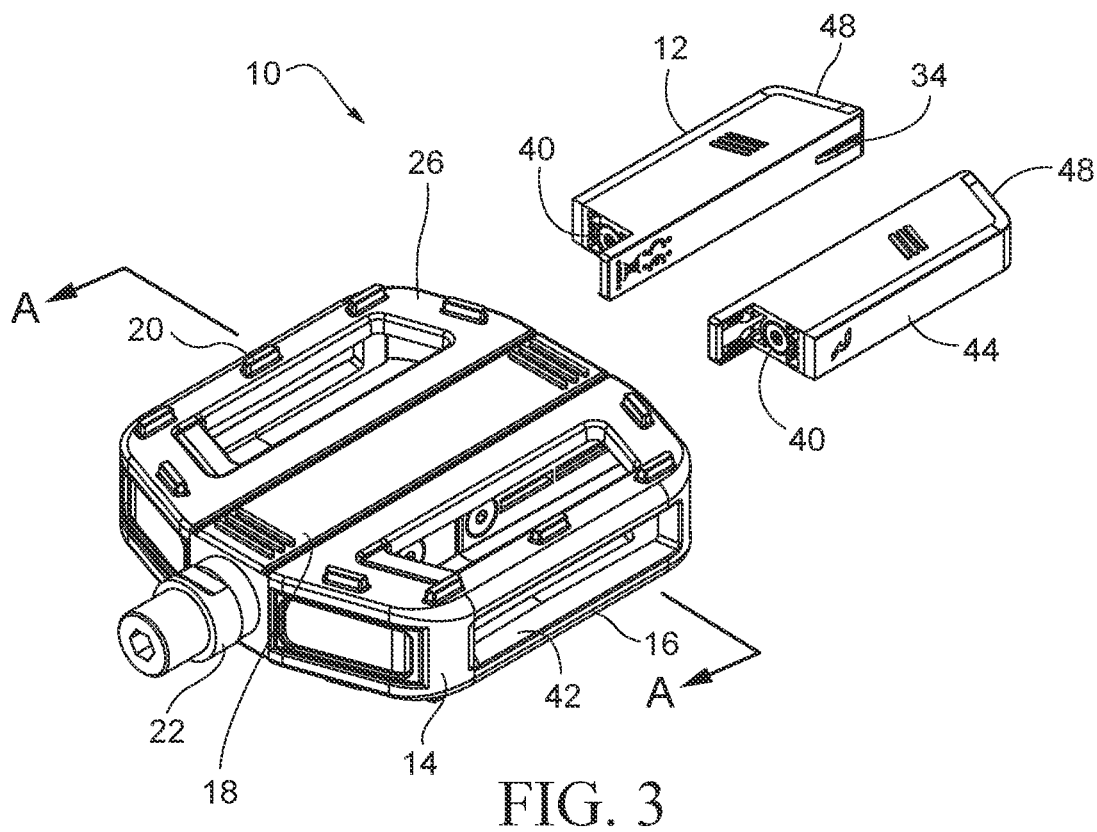
FIG. 3 is a left-facing perspective view of the Automated Bicycle Light System of FIG. 1, showing a pedal with both light modules removed from the pedal.
Figure 4:
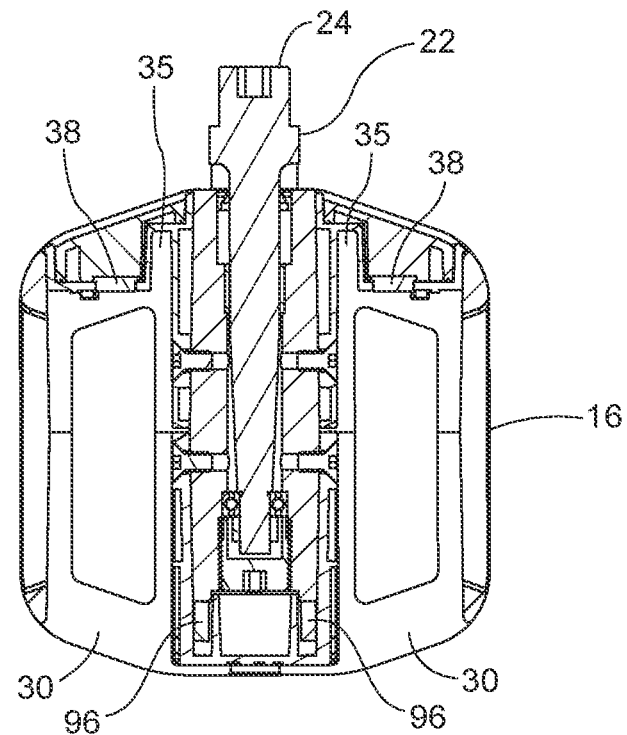
FIG. 4 is a cross-sectional view of taken along the line A-A of FIG. 3, showing interior portions of the pedal.

The pedal frame 16 further includes outboard pedal face openings 46 (see FIG. 2). For the purposes of this disclosure the term "outboard pedal face opening" or "outboard face" refers to those openings for faces of the pedal frame 16 opposite the threaded end 24 of the pedal axle 22. That is, the term "outboard pedal face opening" or "outboard face" refers to those faces of the pedal frame 16 furthermost from the crank arm of the bicycle to which the pedal 14 is attached. The outboard pedal face openings 46 are disposed equidistant from each other on both sides of the hub 18. The outboard pedal face openings function to allow light to be projected outwardly by an outboard face 48 of each light module 12.

The pedal 14 of the present invention is specifically designed to maximize the visibility of the light modules 12 so that cyclists are readily seen and identified by vehicle operators at night. With two pedals 14, i.e. right and left, and two light modules 12 in each pedal, the longitudinal and outboard pedal face openings 42 and 46 allow light to be projected 360 degrees about the bicycle, which maximizes cyclist detection by vehicles. The longitudinal and outboard pedal face openings also allow some light to be projected on the ground and thereby create a section of ground that is illuminated, further enhancing how well the cyclist can be seen.

With reference to FIGS. 5-8, the light module 12 of the present invention includes a light module housing 62 which is configured to be removably receivable within the light module retention slot 30 of the pedal frame 16. The light module housing 62 includes a longitudinally facing light source 64 and an outboard facing light source 66, which are configured so as to project light through the longitudinal pedal face openings 42 and outboard pedal face openings 46, respectively, in the pedal frame 16. In the exemplary embodiment, the longitudinally facing light source 64 and an outboard facing light source 66 comprise "chip-on-board" LED strips able to emit both red and white light. LED strips that emit different colors and/or more colors are commercially available and are also suitable for use in the light sources of the present invention light module 12.

The light module 12 of the present invention has at least two light states, where a first light state corresponds to a particular light color and a second light state corresponds to a different light color. The first and second light states may also correspond to the lights sources being in a flashing mode or to a combination of a particular color and a flashing mode. The first and second light states may also correspond to the light sources being "on" or "off."

Formed in a side wall of the light module housing 62 is the magnet 40 which is used to engage the magnet 38 disposed in a wall of a light module retention slot 30, the two magnets serving to secure the light modules 12 in the retention slots 30. The light module housing 62 also includes the anti-rattle tab 34, which engages with the anti-rattle slot 32 of the light module retention slot 30, which functions to prevent rattling of the light modules 12 within the pedal 14 during riding of a bicycle equipped the automated bicycle lighting system 10 of the present invention. The light module 12 is also equipped with an on/off switch 68, a power connector 70 in the form of a USB charging plug and a grip element 72 disposed on opposite side of the light module housing 62.

Figure 5:
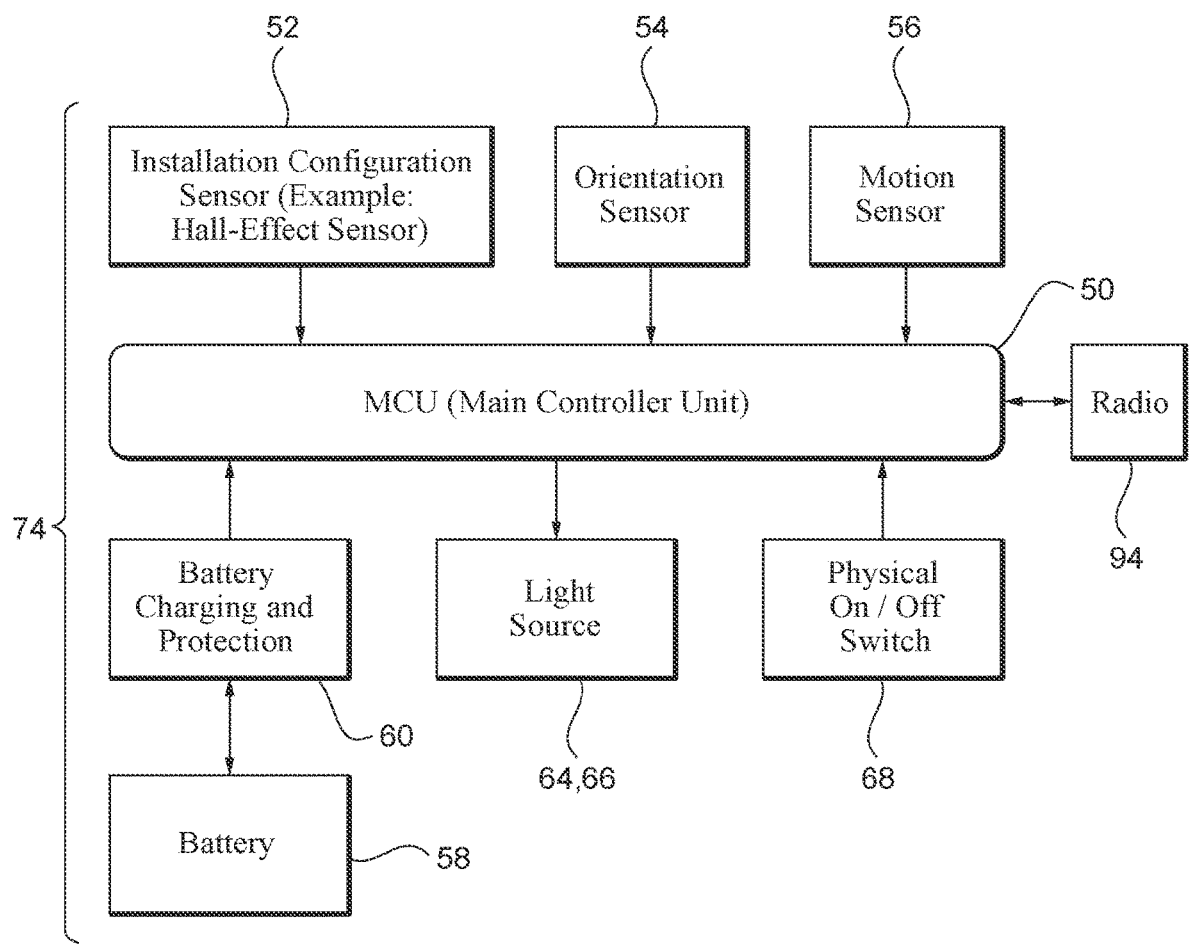
FIG. 5 is an exemplary block diagram depicting the electrical components of a light module of the present invention.
Figure 6:
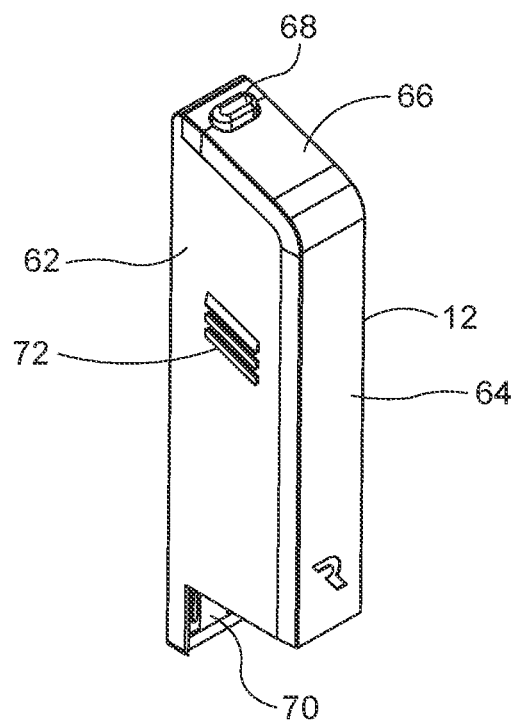
FIG. 6 is a right-facing perspective view of a light module of the present invention showing the module in a vertical orientation.
Figures 17, 17A:
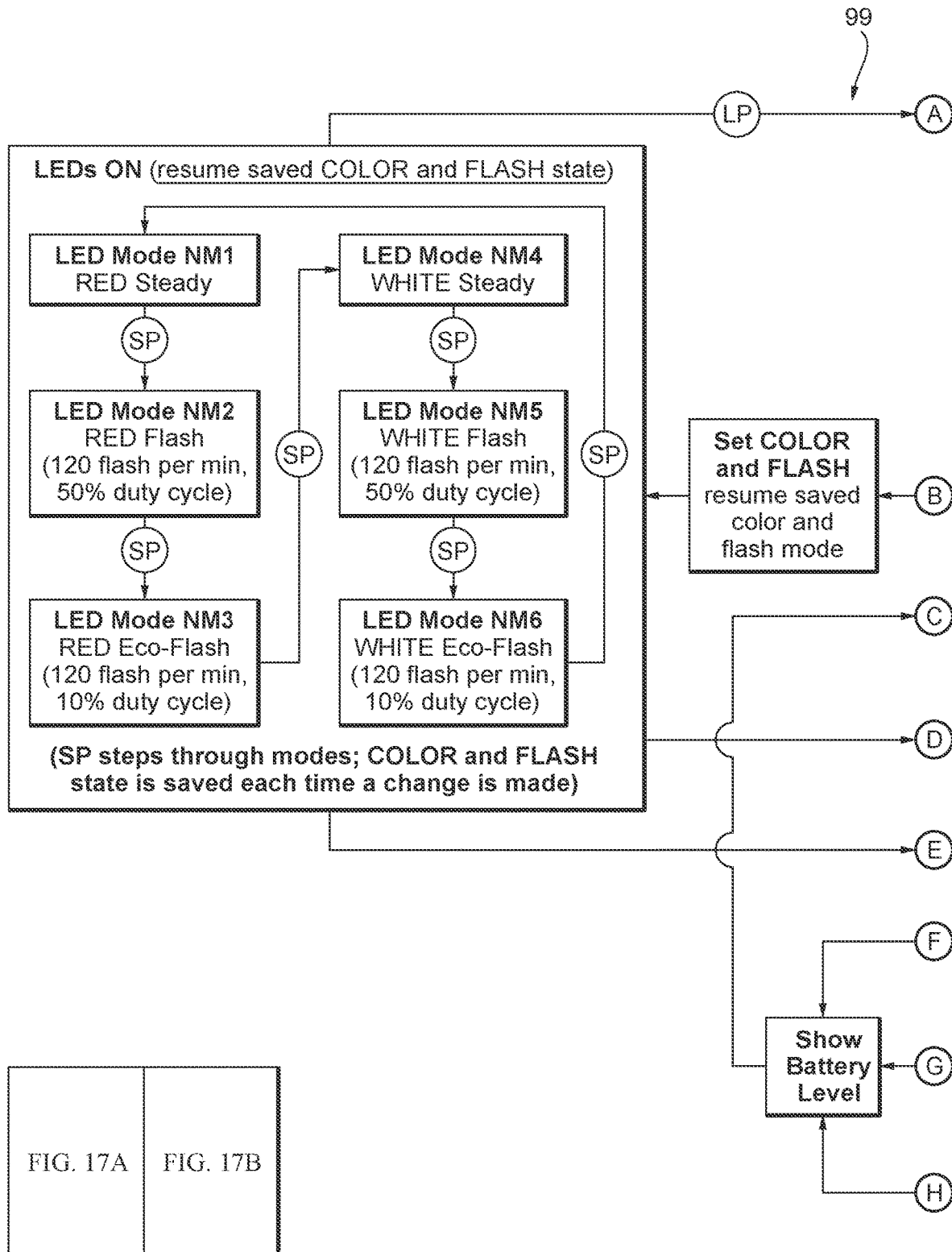
FIG. 17 indicates that the FIG. 17 is a flow chart comprising two FIGS. 17A and 17B.
FIG. 17A a first portion of a flow chart comprising firmware processing steps suitable to operate the light modules of the present invention.
Figure 17B:
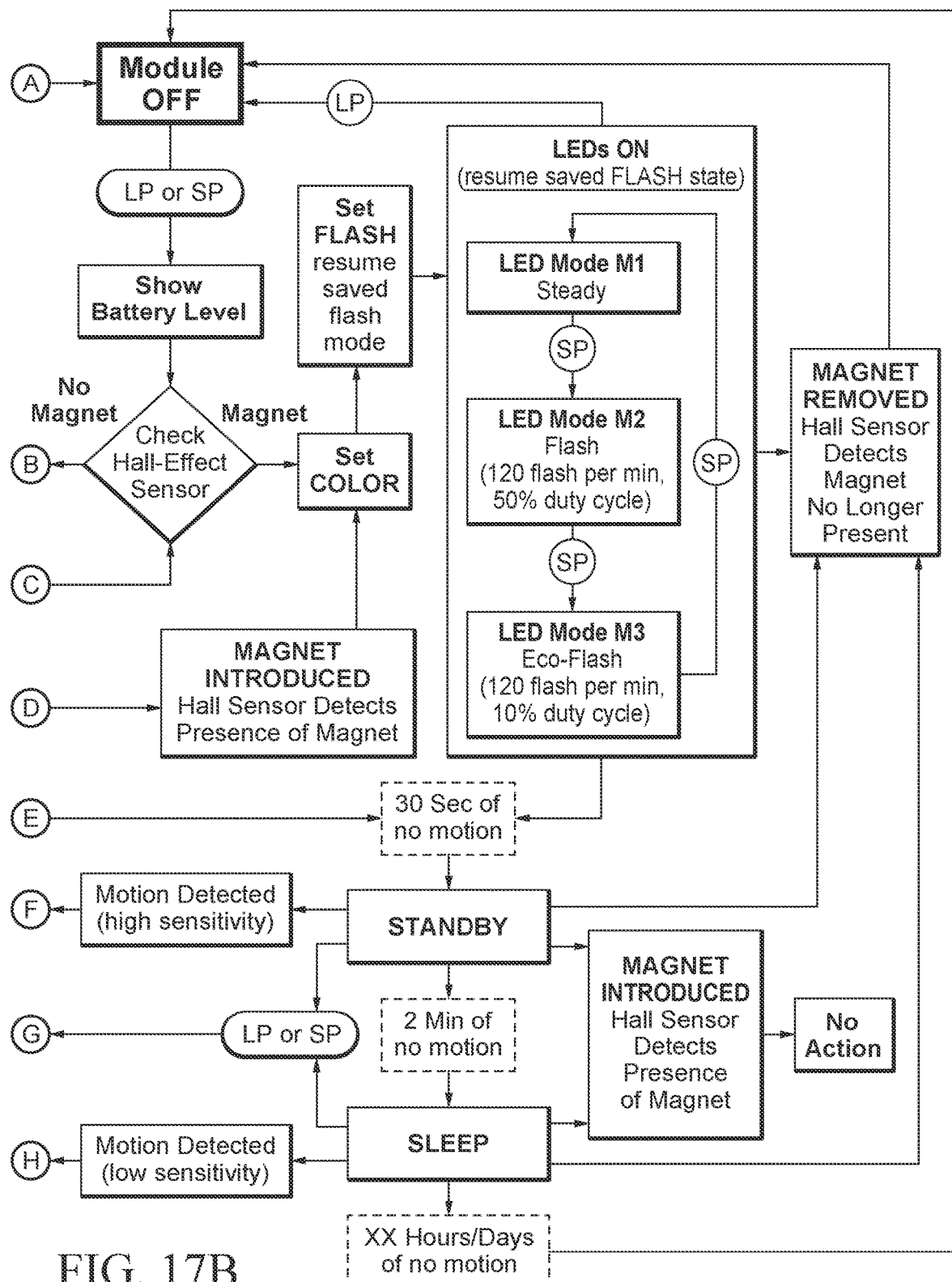
FIG. 17B is a second portion of a flow chart comprising firmware processing steps suitable to operate the light modules of the present invention.

With reference to FIGS. 5-8 and particular reference to FIG. 5, the light module 12 includes a processor controlled electrical circuit 74 disposed within the light module housing 62. The electrical circuit 74 includes a processor ("CPU") 50, an installation configuration sensor 52, an orientation sensor 54, a motion sensor 56, a battery 58 and a battery charging and protection module 60. The electrical circuit 74 also includes a manually operable on/off switch 68 (see FIGS. 6 and 8). The processor 50 contains an instruction set which allows the processor 50 to control the operation, i.e. set the state of the light module 12 during use based upon inputs from the installation configuration sensor 52, the orientation sensor 54 and motion sensor 56. In the exemplary embodiment, the installation configuration sensor 52 is a Hall effect sensor, the orientation sensor 54 is a gyroscope accelerometer combination, and the motion sensor 56 is a three axis accelerometer. An exemplary flow chart 99 of a processor instruction set 99 suitable for use with the light module 12 of the present invention is shown in FIG. 17. In the figure, the abbreviation "LP" refers to a long button press, for example of about 1.5 seconds or longer, whereas the abbreviation "SP" refers to a short button press, for example, of less than 1.5 seconds. The term "High Sensitivity" refers to any motion at all and the term "Low Sensitivity" refers to intermittent motion for at least 2.5 seconds.

The electrical circuit 74 may also include a radio 94, where the radio 94 communicates information about the state of the light module 12 to an external device, such as for example, a mobile phone. The electrical circuit 94 may also be configured such that the processor 50 is responsive to signals received from the radio 94.

The installation configuration sensor 52, which in the exemplary embodiment is a Hall effect sensor, detects the presence and polarity of a magnet 96 embedded in the pedal frame 16 and the processor 50 using this information determines whether the light module 12 is in the left or right pedal since the polarity of the magnet 96 is different in the left and right pedals. The processor 50 also uses the Hall effect sensor as a trigger to shut off the light module 12 when it is removed from the pedal and/or an auxiliary mount. In particular, when the light module 12 is removed from the pedal the processor 50 uses the Hall effect sensor to detect a state change from "magnet present (north or south)" to "no magnet present," and upon detecting a "no magnet present" condition, turns the light module off.

The orientation sensor 54 allows the processor to determine the light module's orientation relative to Earth's gravity and, in particular, allows the processor 50 to determine whether the light module 12 is facing forward of the pedal axle, i.e. in a first orientation relative to the pedal axle or aft of the pedal axle, i.e. in a second orientation relative to the pedal axle. With this information the processor 50 can set the state of the light module 12. In the exemplary embodiment, the processor 50 sets the color state of the light module 12 such that red light is always projected backwards and white light is always projected forwards.

The motion sensor 56 enables the processor 50 to know if the bicycle is either moving or stationary. In the exemplary embodiment, the processor 50 is programmed to turn off the longitudinally facing light source 64 and the outboard facing light source 66 after movement has stopped for a specific period of time. If continuous movement of the bicycle is subsequently detected for another specified period of time, the processor 50 will turn on the longitudinally and outboard facing light sources 64 and 66.

For a predetermined, initial period of time after motion of the bicycle stops, the processor 50 turns off the longitudinally facing light source 64 and the outboard facing light source 66, but frequently monitors the motion sensor 56 for resumed motion of the bicycle, i.e. the processor 50 maintains high sensitivity to motion and reactivates the light sources upon detecting even a relatively small level of motion. This initial predetermined period of time during which the processor 50 maintains a high state of sensitivity to resumed motion is referred to the "standby state" and the initial predetermined time period is referred to as the "standby time."

After the standby time has elapsed the processor 50 and consequently the light module 12 then enters a mode with much lower sensitivity to motion to save battery life, which is referred to as the "sleep state." The sleep state lasts for another predetermined period of time. In the sleep state, the processor 50 continues to monitor the motion sensor 56 for motion but at longer periods than when in the standby state. If an appropriate level and duration of motion is detected during the sleep state, the processor 50 will again turn on the longitudinally and outboard facing light sources 64 and 66.

Upon expiration of the duration of the sleep state period, if no motion has been detected, the processor 50 will shut off completely and the light module 12 will enter an "off state." Once the light module 12 enters the "off state", manual actuation of the on/off switch 68 is required to turn on the light module. The above-described sensors and programming allow for automatic on and off operation and state change of the light module 12, based on motion.

Figure 9:
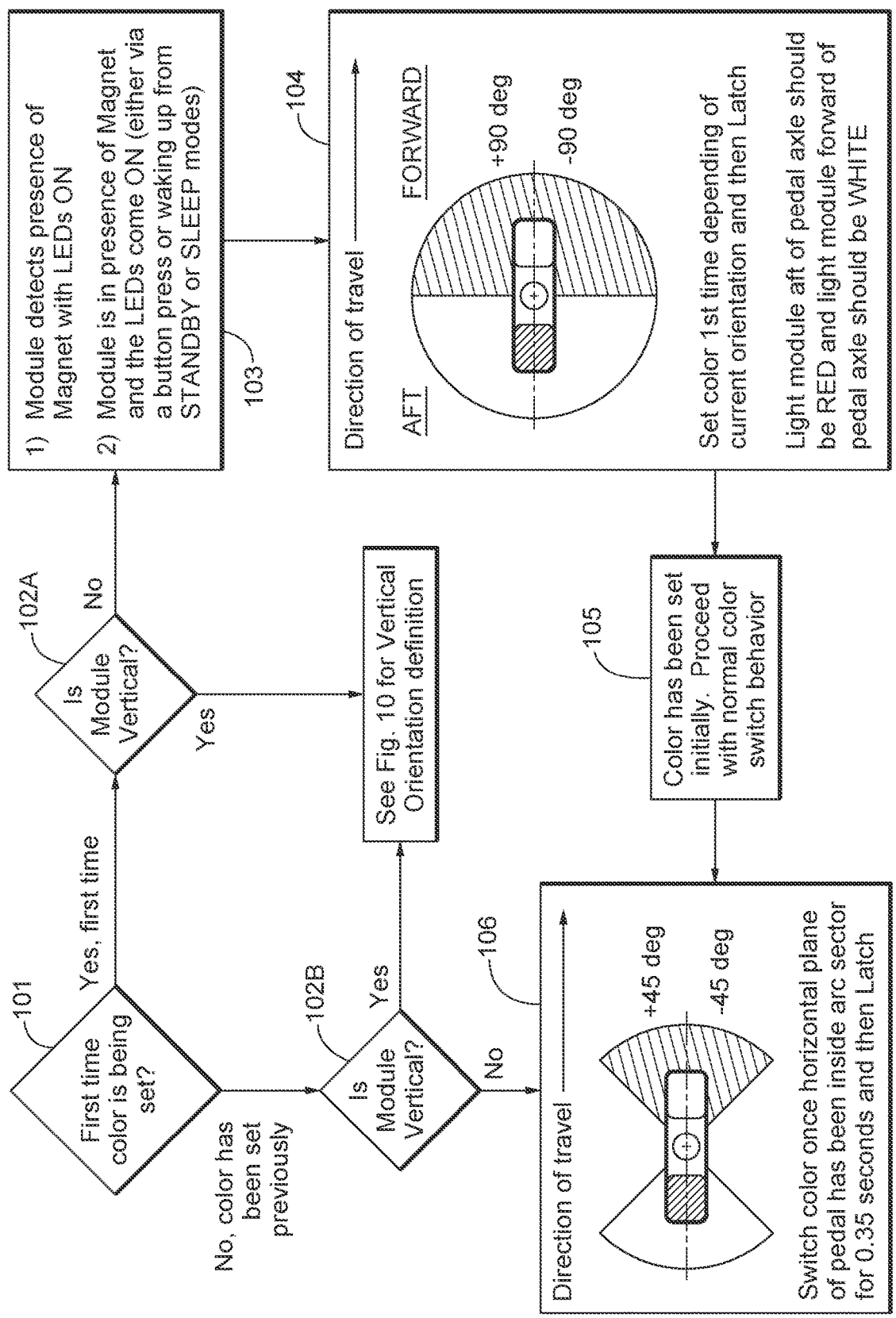
FIG. 9 is an exemplary top level flow chart showing the programming steps for setting the color state of a light module of the present invention.

With reference to FIG. 9, a high level flow chart illustrating the light module color state programing is shown.

In step 101, the processor 50 determines whether the color state of the light module 12 has been previously set. If the answer is no, in step 102A, the processor 50 determines via the orientation sensor 54 whether the light module 12 is positioned vertically. A vertical orientation indicates that the light module 12 is being used in an auxiliary mount rather than in a pedal, whereas generally horizontal orientation, indicates the light module is being used in a pedal. If the answer is the light module is not vertical, i.e. is in a pedal rather than an auxiliary mount, in step 103, the processor detects whether the longitudinally facing and outboard facing light sources 64 and 66 are turned on either from actuation of the on/off switch 68 or waking up from the stand by or sleep modes.

In step 104, with the light sources 64 and 66 turned on, the light module 12 in the forward position in the pedal 14 as indicated by the orientation sensor 54 is set to project white light and the rear or aft facing light module is set to project red light. The forward light module is defined as the light module in front of a vertical plane relative to the ground, passing through the pedal axle 22. The rear or aft facing light module is the module behind the vertical plane relative to the ground, passing through the pedal axle 22.

In step 105, after the light color state has been initially set for a predetermined time period, the processor proceeds to step 106.

In step 106, upon the commencement of motion, the processor determines using input from the orientation sensor 54 whether the light module 12 is positioned either forward or aft and positioned within an arc sector of plus or minus 45 degrees from a plane parallel to the ground and passing through the pedal axle 22. After motion has been detected for a predetermined period of time, for example around 0.35 seconds in the exemplary embodiment, the processor 50 sets the forward positioned light module to project white light and rear or aft positioned light module to project red light, regardless of the light modules' original setting. Monitoring of pedal position by the processor 50 is continuous as long as motion is detected.

Figure 9A:
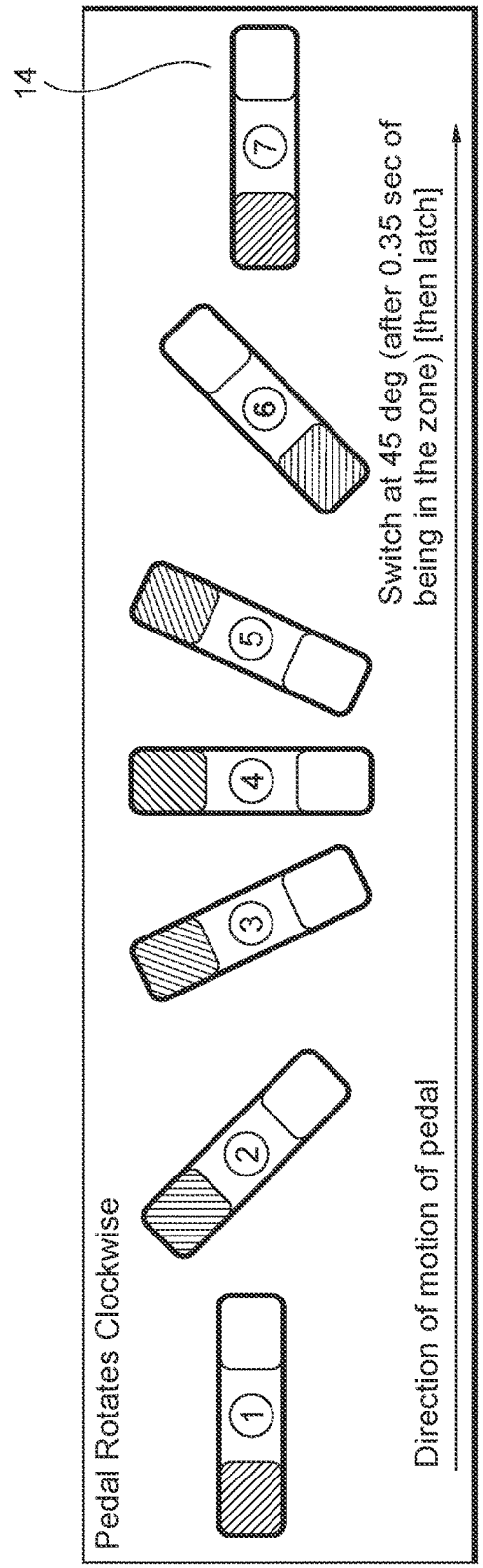
FIG. 9A is an exemplary schematic diagram showing when a light module changes its color state upon clockwise pedal rotation.
Figure 9B:
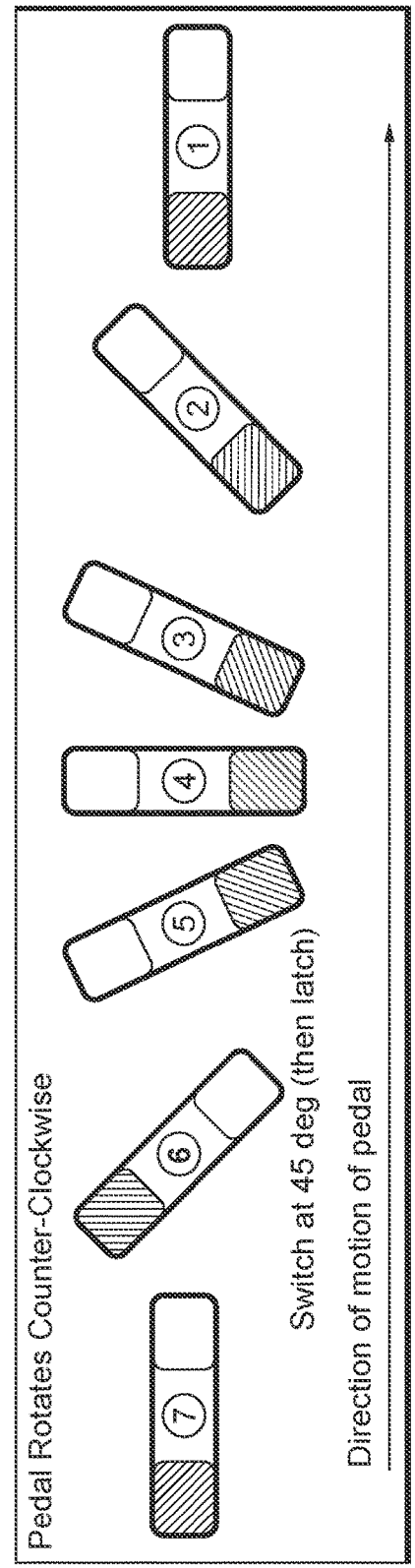
FIG. 9B is an exemplary schematic diagram showing when a light module changes its color state upon counter-clockwise pedal rotation.
Figure 11:
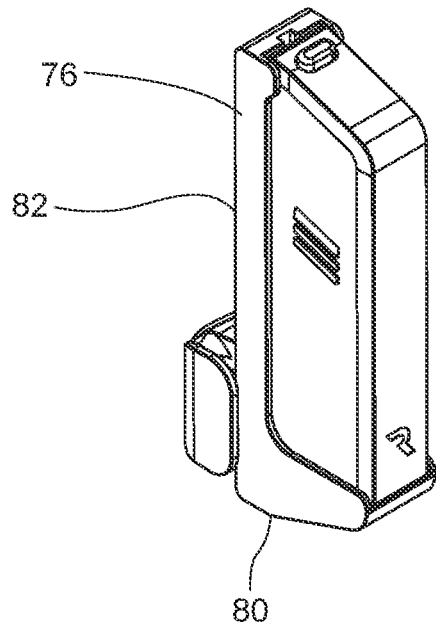
FIG. 11 is a perspective view of an auxiliary mount suitable for use with the light module of the present invention, showing a light module retained in the mount.
Figure 12:
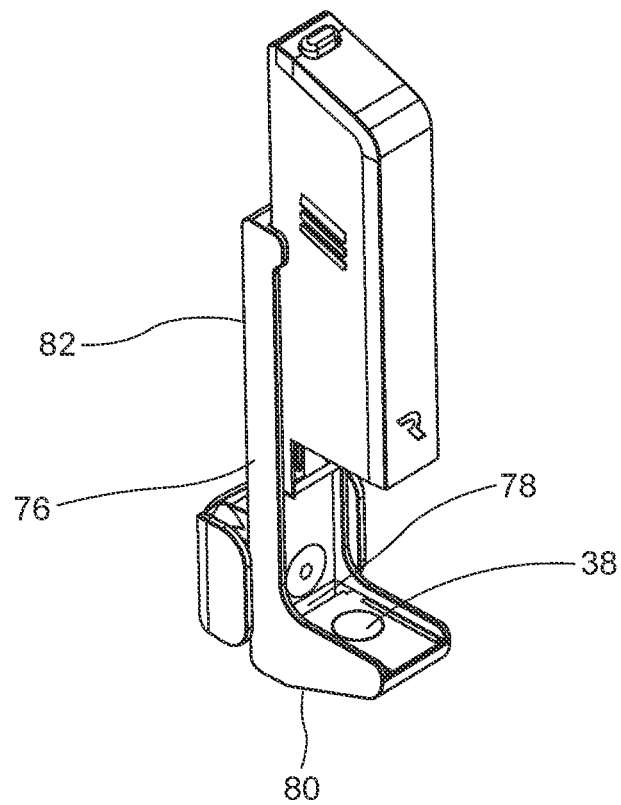
FIG. 12 is another perspective view of an auxiliary mount of FIG. 11, showing a light module partially inserted into the mount.
Figure 13:
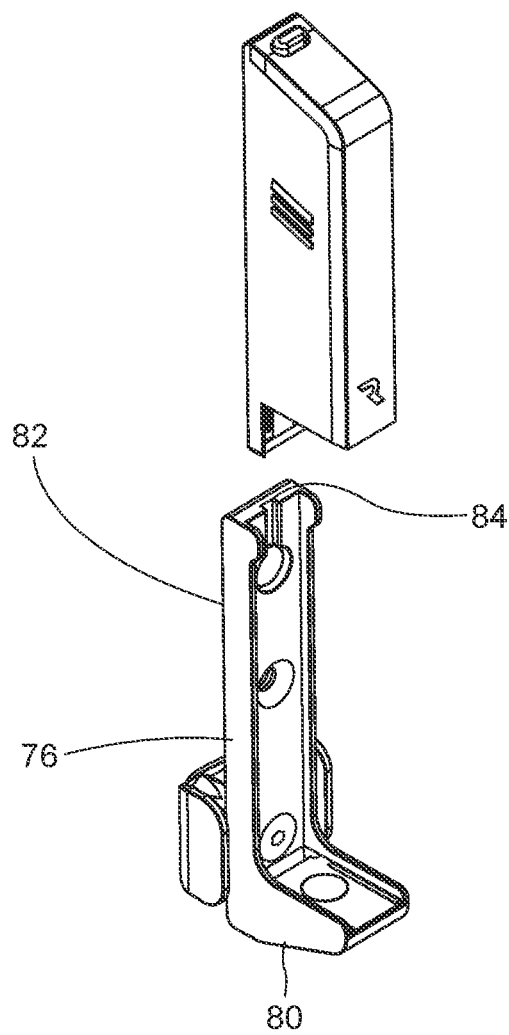
FIG. 13 is another perspective view of an auxiliary mount of FIG. 11, showing a light module removed from the mount.
Figure 14:
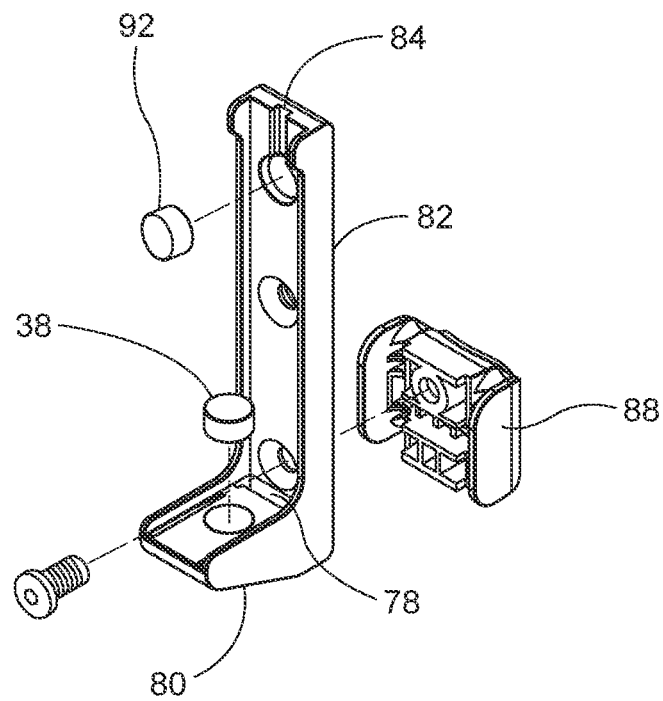
FIG. 14 is another perspective view of an auxiliary mount of FIG. 11, showing the position of magnets within the mount, and an adapter attachable to the mount, suitable for attaching the mount to tubes such as handlebars and bicycle frame tubes.
Figure 15:
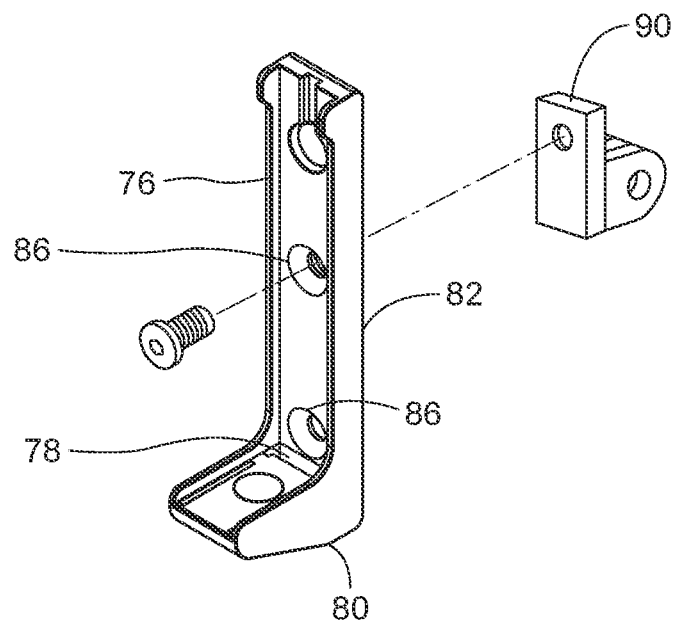
FIG. 15 is another perspective view of an auxiliary mount of FIG. 11, showing a clevis-style adapter attachable to the mount, suitable for attaching the mount to interfaces equipped with clevis fittings.

With reference to FIGS. 9A and 9B, during riding, a cyclist may intentionally or inadvertently "flip" one or both of the pedals 14. The processor 50, continuously monitoring pedal position and orientation, will change the light color of a light module 12 upon the module flipping from a forward to an aft position or vice versa. The processor 50 will initially detect when pedal rotation about the pedal axle 22 exceeds 45 degrees from horizontal as the pedal begins to flip either clockwise or counterclockwise and will detect when the pedal has completed 135 degrees of rotation, i.e. is in a position about 45 degrees from horizontal on the other side of the pedal axle 22, and will reset the light color at 135 degrees of rotation depending upon whether the pedal has rotated clockwise from an aft to a forward position (light color changes from red to white) or has rotated counterclockwise from a forward to an aft position (light color changes from white to red).

With reference again to FIG. 9, in step 101, if the answer is yes, the color mode has been previously set, the processor proceeds to step 102B and determines whether the light module 12 is oriented vertically. If the answer is no, the light module is not oriented vertically which corresponds to the light module being used in a pedal, the processor 50 proceeds directly to step 106 as discussed above.

With reference to FIGS. 11-16, an auxiliary mount 76 for a light module 12 is depicted. The auxiliary mount 76 allows the light module 12 to be attached in other locations on a bicycle. For example, the mount can be used on handlebars, a seat-post, other tubes and struts of a bicycle, wheel spokes, as well as on a bicycle helmet. The auxiliary mount may also be used on other vehicles such as a scooter or motorcycle and could also be attached to a backpack or on a rider or pedestrian's clothes.

The auxiliary mount 76 is configured as an L-shaped bracket having a base leg 80 and an upper leg 82. The auxiliary mount 76 can slideably receive and retain a light module 12. The retention features of the auxiliary mount 76 are similar to those of the pedal 14. The base leg 80 includes a magnet 38 which magnetically couples with the magnet 40 disposed in the housing of the light module 12. The base leg 80 also includes a slot 78 which receives the power connector 70 of the light module 12 for the purpose of better securing the light module 12 to the mount. The upper leg 82 includes a slot 84 for engaging the anti-rattle tab 34 of the light module.

Figure 16:
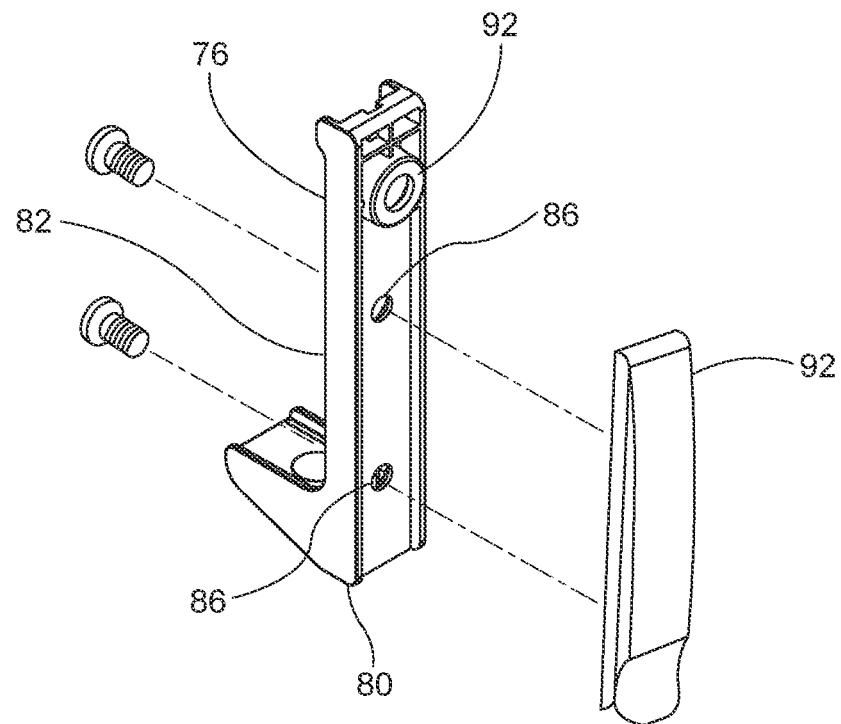
FIG. 16 is another perspective view of an auxiliary mount of FIG. 11, showing another adapter attachable to the mount, suitable for attaching the mount to belts or straps.

The upper leg 82 is also equipped with a pair of chamfered through holes 86. The through holes 86 allow for a variety of adapters to be attached to the auxiliary mount 76 where the adapters allow the auxiliary mount to be attached to a variety of surfaces or objects. For example, the tube adapter 88 shown in FIG. 14 allows the auxiliary mount to be attached to bicycle handlebars, seat-posts and bicycle frame tubes. The clevis style adapter 90 shown in FIG. 15 allows the auxiliary mount to be attached to common camera mounts and any other equipment using this style of attachment interface. An adapter suitable for attaching the auxiliary mount to belts or straps is shown in FIG. 16.

The auxiliary mount 76 further includes a second magnet 92 (see FIGS. 14 and 16), which is positioned on the upper leg 82 such that it will be detected by the installation configuration sensor 52, which in the exemplary embodiment is a Hall effect sensor, of the light module. When the light module 12 detects that it is vertically oriented, it will set the light source color depending upon whether the second magnet 92 has north-south or south-north polarity and dependent upon the position of the on/off switch 68.

In this way, the user can configure the auxiliary mount 76 such that the light module 12 will automatically set its state (such as color or flash mode) when it is placed into the mount 76 regardless of its prior state when it was not in the mount. This is particularly useful for ensuring the light module 12 when used as a bicycle tail light is always red and when used as a bicycle headlight is always white to abide by traffic laws.

With reference to FIG. 9A, in steps 102A or 102B, when the processor 50 of the light module 12 detects via the orientation sensor 54, that the light module is within plus or minus 30 degrees of the Z-axis, as shown in FIGS. 10A and 10B, the processor 50 deems the light module 12 to be in a vertical position. When the light module 12 is in the vertical position and installed in the auxiliary mount 76 with the second magnet 92 installed in the mount, the color state of the light module is established as follows: (1) if the magnet is installed with north-south polarity and the on/off switch 68 is in the up position, the light module 12 projects red light; (2) if the magnet is installed with north-south polarity and the on/off switch 68 is in the down position, the light module 12 projects white light; (3) if the magnet is installed with south-north polarity and the on/off switch 68 is in the up position, the light module 12 projects white light; and, (4) if the magnet is installed with south-north polarity and the on/off switch 68 is in the down position, the light module 12 projects red light.

Yet additional states for the light module 12 may be defined by not including the second magnet 92 in the auxiliary mount. That is, additional light states may be defined when the installation configuration sensor, which in the case of the exemplary embodiment is a Hall effect sensor, fails to detect the presence of the second magnet 92. In particular, if the Hall effect sensor fails to detect the presence of the second magnet 92, the light module will revert to a simple mode where only the On/Off switch 68 will control the state of the LEDs for on or off, color, and flash state. In this simple mode the processor 50 can also be set to ignore all inputs of the orientation and motion sensor.

While the present invention has been described with regards to an exemplary embodiment, additional variations of the present invention may be devised without departing from the inventive concept. For example, additional embodiments of the system may include the following features or functionality.

The light module 12 may be constructed with data communication via the USB port. When plugged into a computer or connected to a phone via cable the light module 12 may display information such as state, battery charge level, and other settings and allow the user to change settings (brightness, flash mode, automatic mode settings, etc.) via a computer or phone application. In addition, the light module firmware may be updated.

The light module 12 may include a wireless communication chip such as low power Bluetooth or similar which enables the light module to be remotely controlled by and communicate with remote devices or a rider's mobile phone. The remote may be used to turn one or more light modules on or off and change the state of one, some, or all.

In addition, the light modules 12 may be configured to act as turn signals while located in the pedals. If a rider is turning right they press the right turn button on the remote and the right hand pedal starts flashing like a traditional turn signal and the left hand pedal changes to a static steady light.

A group of light modules may be configured to communicate with each other and coordinate flash rate or other functions. Using the internal motion sensor, the light modules may detect when the rider is braking or slowing down and change the brightness or flash rate of the light to indicate that the rider is actively braking or slowing down.

Using the built in motion sensor or other potential sensors, the light modules 12 may be used to measure pedal cadence and either store that information or transmit it wirelessly to the rider's cycling computer or mobile phone. In addition, the light modules may measure bicycle speed via an accelerometer and then change the light output or light state based on pedal cadence or bicycle speed. This allows the light module flash rate to be adjusted based on pedaling cadence in order to provide the most visually effective setting.

The light modules 12 may include the ability to stack or clip together for charging so that only a single light module would need to be plugged in and would provide power to the other light modules in the stack. This may be done through a physical connection or through wireless charging.

The light modules 12 may include multiple LEDs or LEDs strips with control over each individual LED such that a dynamic "chase" pattern may be used to indicate the intention to turn when using a turn signal function. In addition, an "emergency stop/flash" pattern may be used. Multiple LEDs may be used to communicate discreet charge levels of the battery. The light module may contain an integrated reflector element.

INDUSTRIAL APPLICABILITY

This invention is an automated bicycle lighting system comprising light modules that contain sensors and a processor which enable the color and/or flash state of the emitted light to be changed depending upon the physical orientation of the modules. The sensors and processor also allow the operating state of the light modules to be adjusted depending upon whether movement of the light module's is sensed. The modules are used in combination with pedals configured to removably receive the modules and/or with an auxiliary mount the provide for mounting the modules to other components of a bicycle, such as, for example, handlebars, seat-posts, frame tubes, helmets and a rider's clothing. The automated bicycle lighting system of the present invention may be industrially applied to the development of safety equipment in the form of improved lights for bicycles and cycling equipment.

What is claimed is:

1. An automated bicycle lighting system comprising:
a pedal having a pedal frame with a first face, a second face opposite the first face, and a hub, wherein the hub is freely rotatable about an axle; and
a first light module and a second light module that are both connected to the pedal frame, the first and second light modules each having a light source capable of emitting at least a first light state and a second light state,
wherein at least one processor receiving information from at least one orientation sensor is configured to set
the first light source to the first light state if the first light module is positioned in a forward orientation when one of the first and the second face of the pedal frame is facing toward a ground surface,
the second light source to the second light state if the second light module is positioned in a rearward orientation when the one of the first and the second face of the pedal frame is facing toward a ground surface,
the first light source to the second light state if the first light module is positioned in the rearward orientation when the other of the first and the second face of the pedal frame is facing toward the ground surface, and
the second light source to the first light state if the second light module is positioned in the forward orientation when the other of the first and the second face of the pedal frame is facing toward the ground surface.

2. The automated bicycle lighting system of claim 1, wherein the first light state and the second light state are both activated states such that the first and second light modules project light.

3. The automated bicycle lighting system of claim 2, wherein the first light state corresponds to a white light, and the second light state corresponds to a red light.

4. The automated bicycle lighting system of claim 2, wherein the first light state corresponds to a steady light, and the second light state corresponds to a flashing light.

5. The automated bicycle lighting system of claim 2, wherein
the first light module and the second light module both project light in a direction perpendicular to a longitudinal axis of the axle, and
the first light module and the second light module further project light in a direction parallel to the longitudinal axis of the axle.

6. The automated bicycle lighting system of claim 1, wherein the first light state and the second light state are set while the pedal is in motion.

7. The automated bicycle lighting system of claim 1, wherein the first light module and the second light module are removably insertable within the pedal frame.

8. The automated bicycle lighting system of claim 7, wherein the pedal frame includes a first light module retention slot and a second light module retention slot that are both structured and configured to receive either of the first light module and the second light module.

9. The automated bicycle lighting system of claim 8, wherein
the first and second light module retention slots each include a magnet disposed in or on a sidewall,
each of the first light module and the second light module include a magnet configured to pair with either magnet of the first and second light module retention slots.

10. The automated bicycle lighting system of claim 1, further comprising a motion sensor enabled to provide information to the processor, wherein
the processor further controls the operation of the first and the second light modules dependent upon whether the first and the second light modules are moving or stationary,
the first light state corresponds to one of a white light or a red light,
the second light state corresponds to the other of the white light or the red light,
the light source is capable of emitting a third light state,
the third light state corresponds to no light,
the processor activates the third light state when the motion sensor detects that the at least one light module is stationary and communicates the stationary status to the processor.

11. The automated bicycle lighting system of claim 1, wherein the first light module and the second light module are positioned between the first face and the second face.

12. The automated bicycle lighting system of claim 1, wherein
the pedal frame has a first end and a second end,
the first end is opposite the second end,
the first light module is nearer the first end than the second end when in the forward orientation, and
the second light module is located nearer the second end than the first end when in the rearward orientation.

13. The automated bicycle lighting system of claim 1 in combination with a bicycle, wherein the processor is configured to receive information from a configuration sensor and determine whether the pedal is positioned on a right side or a left side of the bicycle.

14. The automated bicycle lighting system and bicycle of claim 13, wherein the configuration sensor includes a magnet and a magnet sensor.

15. A method for changing a light state on a bicycle pedal, the method comprising:
providing a pedal in an approximately horizontal position, wherein
the pedal is in a first orientation having one of a first and a second face of a pedal frame of the pedal facing toward a ground surface,
first end and a second end of the pedal frame each have a corresponding light module,
the first light module has a corresponding first light source in a first light state, and
the second light module has a corresponding second light source in a second light state; and
rotating the pedal until the pedal is in a second orientation having the other of the first and the second face of the pedal frame facing toward the ground surface, wherein
the first light source automatically switches from the first light state to the second light state when the pedal transitions from the first orientation to the second orientation,
the second light source automatically switches from the second light state to the first light state when the pedal transitions from the first orientation to the second orientation, and
the first light source and the second light source simultaneously switch their light states when the pedal transitions from the first orientation to the second orientation.

16. The method of claim 15, wherein the first light state corresponds to a white light, and the second light state corresponds to a red light.

17. The method of claim 15, wherein
the first orientation of the pedal has the first end of the pedal frame facing one of forward or rearward and approximately 45 degrees above or below a horizontal axis line,
the second orientation of the pedal has the first end of the pedal frame facing the other of forward or rearward and approximately 45 degrees above or below the horizontal axis line, and
the switch from the first light state to the second light state automatically occurs when the first end of the pedal frame rotates from the first orientation into the second orientation.

18. The method of claim 15, further comprising rotating the pedal from the second orientation to the first orientation, wherein
the first orientation of the pedal has the first end of the pedal frame facing one of forward or rearward and approximately 45 degrees above or below a horizontal axis line,
the second orientation of the pedal has the first end of the pedal frame facing the other of forward or rearward and approximately 45 degrees above or below the horizontal axis line,
the first light source automatically switches from the second light state to the first light state and the second light source automatically, and simultaneously, switches from the first light state to the second light state, and
the switch between the first light state and the second light state automatically occurs when the first end of the pedal frame rotates into the first orientation.

19. An automated bicycle lighting system comprising:
a first pedal having a pedal frame with a first face, a second face opposite the first face, and a hub, wherein the hub is freely rotatable about an axle;
a second pedal having a pedal frame with a first face, a second face opposite the first face, and a hub, wherein the hub is freely rotatable about an axle;
a first light module connected to the first pedal frame, the first light module having a light source capable of emitting at least a first, white light state and a second, red light state; and
a second light module connected to the second pedal frame, the second light module having a light source capable of emitting at least a first, white light state and a second, red light state, wherein
the first light module is exchangeable with the second light module,
the first and second light modules emit in the first, white light state when they are positioned in a first orientation, and the first and second light modules emit in the second, red light state when they are positioned in a second orientation that is 180 degrees opposite the first orientation.

* * * * *